UNITED STATES PATENT OFFICE 2,628,325

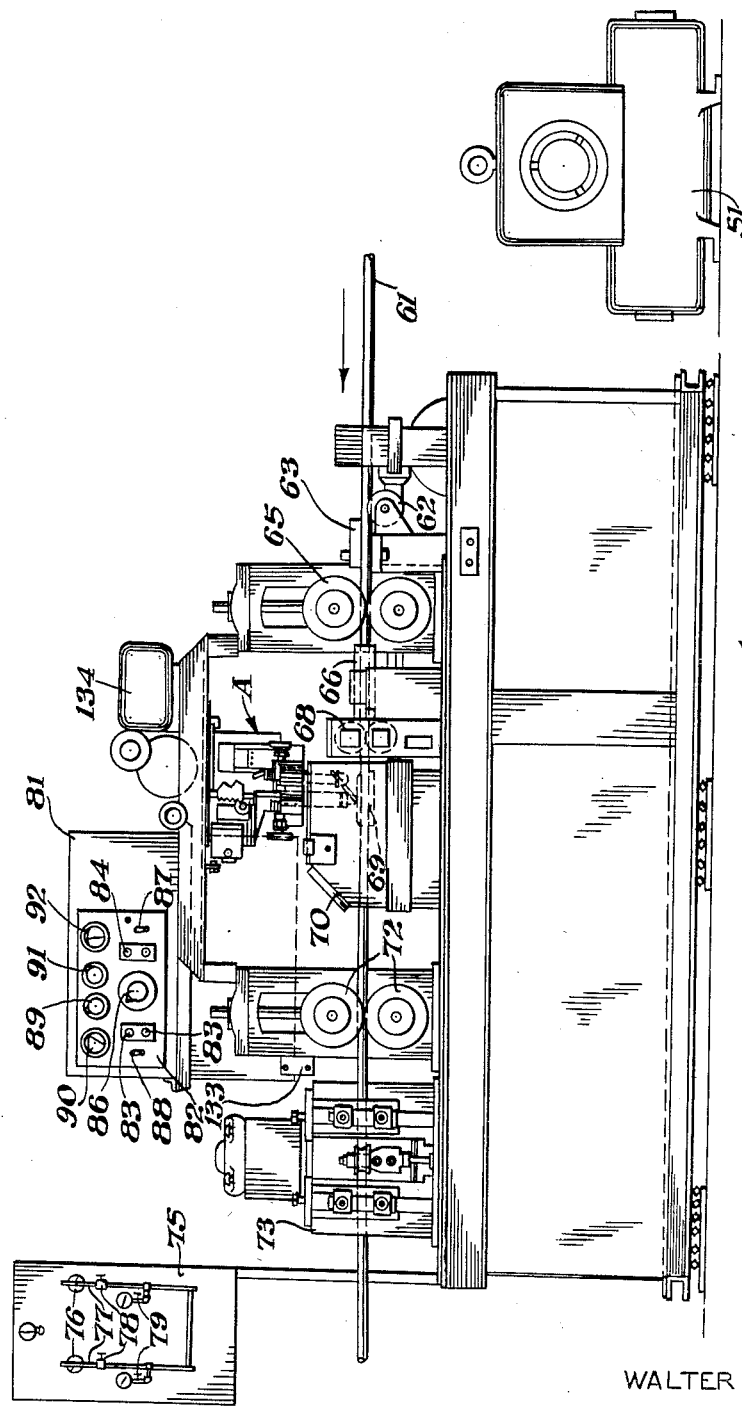

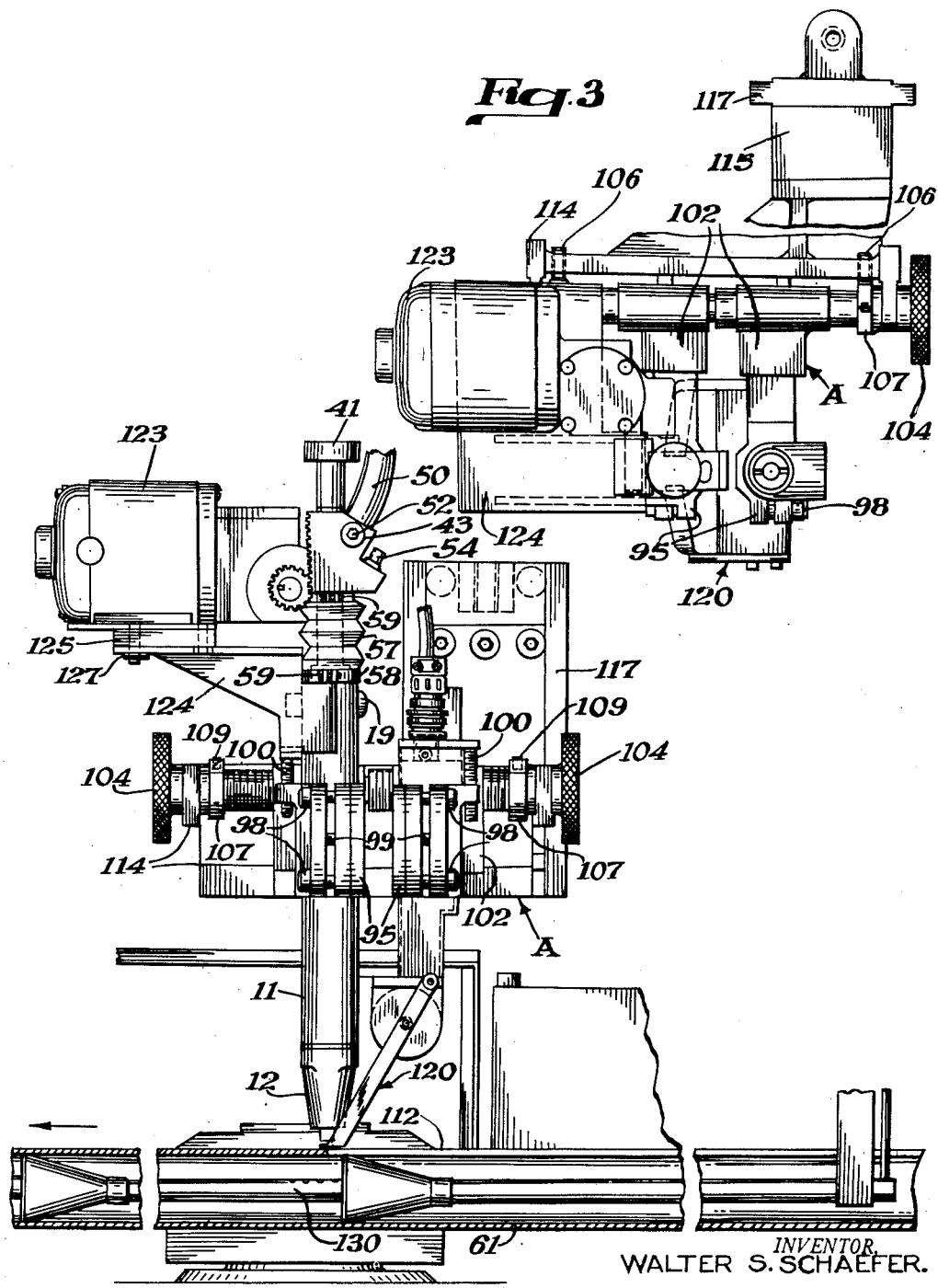

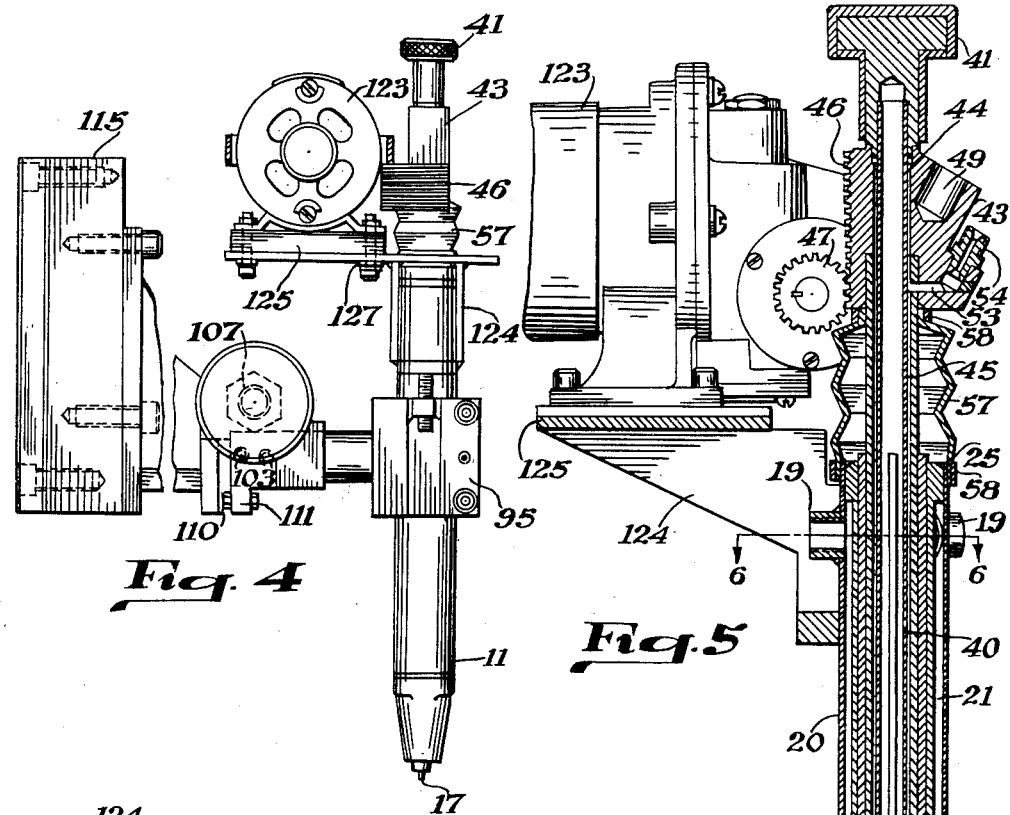

APPARATUS FOR INERT-ARC WELDING

Walter S. Schaefer, East Gadsden, Ala., assignor to Republic Steel Corporation, Cleveland, Ohio, a corporation of New Jersey Application February 4, 1949, Serial No. 74,601

3 Claims. (Cl. 314—69)

The present invention relates generally to the welding art, and is more particularly concerned with a novel process for continuously welding longitudinal metallic seams such as are produced in the manufacture of seamless tubing from open seam blanks, and with means implementing that method including a novel, automatic, inert-arc welding torch.

The inert-arc welding methods known and used heretofore, have not produced welds of the desired quality and uniformity, and the rate of production has been too low. Furthermore, the thermal efficiency of prior inert-arc welding processes has been such that gas and electric power costs per unit length of weld have been excessive. These and other shortcomings of the prior art are due in part to the necessity of forming a relatively large volume of cast weld metal compared to the thickness of the base metal in each instance, and this necessity owes its existence to the limitations inherent in the prior art apparatus. This previously known apparatus, moreover has left much to be desired from the standpoint of simplicity of design and construction, ease of manufacture, maintenance and operation, and ruggedness and compactness. Still another difficulty with this apparatus is that it requires certain manipulations in starting the arc, which inevitably result in electrode contamination and operational inefficiency through fluctuations in arc voltage, shorter electrode life and arc instability.

The apparatus of the present invention not only meets all the foregoing demands and enables the elimination of these shortcomings and difficulties, but also enables automatic maintenance of an arc which is stable for very long periods such as one hundred and twenty hours.

The inert-arc welding torch of this invention has an automatic electrode feed mechanism which is independent of the torch gas nozzle adjustment, and also has a refractory metal gas nozzle which can be adjusted independently of the electrode over the weld as it is being formed.

In general, the method of this invention involves the step of establishing and maintaining throughout the welding operation a blanket of gas of substantially uniform thickness over a portion of an electrode and over an arc supported thereby. More specifically, the present method includes the steps of continuously generating a gas stream, continuously moving said stream relative to an electrode and maintaining throughout the welding operation a blanket of said gas stream of substantially uniform thickness over a portion of the electrode and its arc.

In carrying out my invention in practice, a welding arc is established between the tungsten electrode of an inert-arc torch of this invention and the edges of a seam of a previously formed tube blank by jumping the gap with high voltage at a high frequency. The fluid-cooled gas nozzle is then lowered to a position where it completely shields and cools the hot end of the electrode, and relative motion between the open seam blank and the electrode carrying the arc between them causes the blank to be welded with a speed which is sufficiently greater than that produced by other processes heretofore known to result in a very substantial increase in thermal efficiency and a very narrow weld structure.

A conventional tube welding machine may be employed in carrying out this method, a previously formed open seam tube blank being moved continuously relative to the torch by means of insulated non-magnetic rolls disposed on either side of the torch. In order that the inside weld bead may be kept small and bright, the blank is moved around a gas mandrel and under a magnetic arc director, both of which are described and the latter of which is claimed in my co-pending application, Ser. No. 9,575, filed February 19, 1948. A uniform, steady welding arc is maintained between the electrode and the tube blank, and by butting the ends of successive open seam tube blanks tightly together and using the torch of this invention, the arc will jump from blank to blank without interruption and can automatically be maintained continuously for very long periods, as described above.

My present torch comprises generally a nozzle, electrode holder mechanism associated with the nozzle, and means for moving this mechanism axially relative to the nozzle. This is in sharp contrast to the previously known torches of this type in which the electrode, torch and gas nozzle are all rigidly connected together so that the height of the gas nozzle above the work diminishes as the electrode burns away and the nozzle would eventually be burned away itself if the arc were not extinguished and the electrode reset or replaced in order to enable placing the nozzle at a safe distance from the work.

In its preferred form the torch of the present invention also includes means for automatically actuating the said moving means and maintaining substantially constant arc gap and arc voltage. For lack of this means it was unknown in the prior art to feed the welding electrode downward automatically and continuously at a rate which would compensate for burn-off, and it was also unknown to move the electrode up or down automatically, as required, to maintain the arc voltage constant at all times. It is therefore possible for the first time by virtue of this invention to maintain automatically the desired spacing between the end of the electrode and the molten puddle and maintain the desired energy input into the weld for the purposes and to the advantages mentioned above. Still another important advantage of this invention, particularly as applied to the production of stainless steel tubes, is that it affords close and automatic control over the distance separating the gas nozzle and the molten puddle, as well as the quantity and velocity of the shielding gas flowing, and thus makes possible control to a large extent of the appearance and form of the outside weld bead. An additional advantage flowing from this control of the distance separating the nozzle from the weld bead during the welding operation is that the amount of shielding gas required may be maintained at a minimum at considerable savings over heretofore conventional practice.

With reference to the drawings accompanying and forming a part of this specification:

Figure 1 is an elevational view of a tube welding machine embodying apparatus of this invention;

Figure 2 is a side elevational view of the inert-arc welding torch of this invention equipped with a magnetic arc director and associated with an inert-arc gas mandrel rod within a tube blank in position for welding;

Fig. 3 is a plan view of the apparatus of Fig. 2;

Figure 4 is a side elevational view of the torch of Fig. 2;

Figure 5 is a vertical, sectional view of the torch of Fig. 2;

Figure 6 is a view taken on line 6—6 of Fig. 5;

Figure 7 is a view taken on line 7—7 of Fig. 5; and

Figure 8 sets forth plan, side elevational and bottom views of the insulating electrode guide of the torch of Fig. 2.

With reference particularly to Figs. 2, 3, 4 and 5, the torch of this invention comprises a body 10, a shell 11, a nozzle 12, and means within the torch body including a collet tube 14, an electrode collet 15, and an insulating tube 16 whereby an electrode element 17 may be moved axially through the body and nozzle 12 in insulated relation to body 10. Tubes 14 and 16 and the electrode and collet are telescoped in body 10 and coaxial therewith and with shell 11 and nozzle 12 so that the electrode is aligned with the nozzle aperture for movement through the body and nozzle without danger of breakage despite close fitting, guiding engagement of the electrode with a portion of the nozzle, as will subsequently be described.

The shell, as shown in Figs. 2, 5 and 6, is provided with two water hose connections 19, body 10 being grooved on its outer side longitudinally as indicated at 20 and 21 and annularly as shown at 23 (Fig. 5) whereby the shell, body and nozzle 12 together define a passageway for cooling water flow between these two connections and into contact with portions of these several parts subject to very high temperatures in the course of the welding operations. At its upper end, body 10 is of enlarged diameter substantially the same as the inside diameter of the shell and these two parts are there engaged and secured fluid-tightly together by means of a weld indicated at 25. The lower end of the shell is similarly secured to a ring 26 which extends partly thereinto, and the lower end of the body extends from the shell and terminates in an externally threaded portion 27 of reduced cross section.

Nozzle 12 is of generally frustro-conical shape and is provided with an axial opening and an annular recess 28 extending deeply from its upper end to receive water flowing between connections 19. At its upper end the nozzle bears on a gasket 29 having a plurality of transverse apertures registered with the cooling fluid passage aforementioned and with the annular mouth of recess 28, and gasket 29 in turn bears on an annular shoulder of body 10 and on the lower surface of ring 26, the nozzle being screwed onto the lower threaded end of body 10 and drawn up tightly. Flow of cooling water through the nozzle thus is permitted, while the leakage of said water into the electrode chamber of the body and the nozzle is prevented. An insulating electrode guide 30 of dielectric material having good mechanical strength and heat resistance, such as steatite ceramic, is fit snugly into the nozzle for the purpose of keeping the electrode exactly centered in the nozzle at all times. Guide 30, as illustrated in Fig. 8, has an axial aperture 31 which is of somewhat reduced diameter adjacent to one end for a sliding fit of the guide and electrode, but in this section of the guide a plurality of apertures 33 opening through the lower end of the guide and communicating with the larger diameter portion of the said axial aperture, are provided to afford a passageway entirely through the guide for shielding gas flow. A nozzle insert 35 of non-magnetic refractory metal such as tungsten is situated below guide 30, being heavily press-fitted to nozzle 12 and extending through the nozzle.

Collet 15 is a machined steel, pull-type split ring collet and it is welded at its upper end to a long steel tube 40 extending from the upper end of body 10 and having a threaded upper end to receive an insulated nut 41 whereby the collet may be pulled into collet tube 14 and tightened onto electrode 17. Adjacent to nut 41 the upper end of tube 40 extends through an inlet block 43 in spaced relation to define a small annular passage 44 closed at its upper end by nut 41, the lower, reduced end of which is received in the upper end of the block in fluid-tight engagement. The middle and lower portions of tube 40 are similarly spaced from collet tube 14 so that an annular passage 45 of substantially the same cross section as passage 44 is defined, these passages communicating with each other and passage 45 opening into the electrode chamber around the collet. Inlet block 43 is provided with an integrally formed rack 46 for engagement with a pinion 47 actuated and controlled as hereafter to be described, whereby the block may be raised and lowered and electrode 17 may be moved relative to the body and to the blank to which it is being applied in a welding operation. A recess 49 is provided in block 43 to receive the exposed end of a flexible electric cable 50 connected to welding power source 51, such as a motor generator, a screw and guided plug 52 (Fig. 2) serving to clamp the parts tightly together. The block also has a transverse aperture 53 opening into passage 44 and an insert fitting 54 projecting from the block and communicating with aperture 53 for introducing shielding gas into said passage 44. A flexible bellows 57, suitably of rubber, is sealed at its upper end to collet tube 14 and at its lower end to shell 11 by clamping rings 58 which are tightened by screws 59 (Fig. 2). The shielding gas entering passage 44 is thereby prevented from leaking out of the upper end of the torch where it might otherwise escape through the small clearance between collet tube 14 and insulating tube 16.

Referring now to Fig. 1, the tube welding machine shown is conventional, except for the torch, which is that of the present invention, and includes, in the order in which a pipe blank 61 engages or passes them, entering guide rolls 62, gas mandrel support 63, driven feed rolls 65 for propelling blank 61 to seam guide 66 and another set of guide rolls 68 and a set of welding rolls 69 in a welding guard 70. Beyond the welding rolls, where the seam of blank 61 is welded by the torch above described the machine has pulling rolls 72, which the newly formed tube engages after cooling, and a straightening and sizing section 73. A gas control board 75 associated with the machine enables regulation of the flow of inert shielding gas, for example, helium, in both the welding head and the inside mandrel, said gas being piped to machines from a suitable source (not shown) and entering the control board at a reduced pressure where the pressure is further reduced by single stage station regulators 76 and measured by flowmeters 77 and finally reduced to operating pressure by needle valves 78, all of which are suitably conventional in construction and operation and therefor illustrated only diagrammatically. Solenoid valves 79 may be used to stop and start gas flow automatically when the arc is started and stopped. An electrical control cabinet 81, also constituting a part of said machine, contains a high voltage, high frequency arc starter (not shown), electronic arc voltage control and relay panels (also not shown) as well as the operators' control station 82 on which are carried start and stop buttons 83 and manual electrode raise and lower buttons 84, arc current control lever 86, a manual gas valve control switch 87, an automatic arc voltage control switch 88, arc voltage control rheostat 89, the arc voltage meter 90, arc director rheostat 91, and arc current meter 92. The electronic arc voltage control is suitably conventional and by way of example may satisfactorily be of the type disclosed in U. S. Patent No. 2,360,160, which issued on October 10, 1944, to L. G. Pickhaver.

The torch and the arc director sub-assembly indicated at A are held together by clamps 95, which are tightened by cap screws 98 and loosened by set screws 99 and provided with individual height adjusting screws 100 to set the heights of the torch and arc director. Portions of the clamp fit in holes in swivel nuts 102 and are locked in any desired transverse plane and vertical plane by a second set of set screws 103. Nuts 102 are supported by screws 104 which are separate and telescoped so as to turn independently for separate longitudinal adjustment of the torch and director. Nuts 102 may then swivel about the axis of screws 104 to permit examination of the nozzle and replacement or adjustment of the electrode. To prevent accidental turning of screws when the arc or torch are raised, set screws 106 are provided to lock collar nuts 107 and set screws 109. Set screws 106 bear against finished surface 110 and keep the torch and director in line at the seam 112 of blank 61 to be welded. Screws 104 turn in brackets 114 for moving the torch longitudinally, the entire bracket being bolted to an electrical insulation block 115 which is in turn bolted to a vertical slide 117. In this manner the torch brackets, including the arc director 120, torch body 10, shell 11, and nozzle 12, are all insulated from both the electrode and work potentials.

A reversible gear head electric motor 123 is mounted rigidly on a bracket 124 firmly connected to the torch shell as by brazing. Motor 123 is insulated from the bracket as by an insulating plate 125, screw sleeves and washers 127. Gear pinion 47 of insulating material, such as Bakelite, is keyed to the output side of the motor for engagement with the rack to produce vertical motion of the electrode relative to the work, as described above.

In the operation of the illustrated apparatus the torch is set to the desired height above the surface to be welded by manipulation of buttons 133, which control motor 134; and electrode 17 is moved out of the nozzle by manipulation of button 84 which control motor 123 to substantially the same extent as customary with conventional torches. This extension of the electrode, indicated in Fig. 5, brings the tip thereof suitably about $\frac{1}{8}$ inch above the seam 112. Blank 61 is then started to move through the welding machine. To establish the arc, starter button 83 is pushed and high voltage current at a high frequency is induced by a conventional spark gap oscillator (not shown) into a heavy coil (also not shown) which carries the welding current. The welding power source is short circuited with a condenser (not shown) and thus the high voltage appears across the gap between electrode 17 and seam 112. Gas valves 79 also open when the start button is depressed, feeding inert gas to the torch and inside mandrel rod 130 in the tube blank. The high voltage ionizes the gas as it issues from nozzle 12 and establishes a high frequency arc between the electrode and the work. This operation of starter button 83 also closes the main welding circuit, such as the closing of a field relay in a D. C. welding generator, for example. It also opens the voltage and the current meter circuits, as well as the arc voltage connections to the electronic control so that they will not be damaged by the high voltage from the electric arc starter. The welding power arc quickly follows the high frequency starting arc after which the starter button is released, stopping the high frequency and reconnecting the meters and the electronic control. The welding arc voltage is then set by electronic control rheostat 89, for instance, twenty volts with helium gas and D. C. current where stainless tubing is being manufactured. The current is set by rheostat 86 suitably to 286 amperes for the same conditions with the tube being $\frac{7}{8}$ inch diameter, .083 inch wall, type 304 stainless steel running 84 inches per minute and using 20 cubic feet per hour of helium, with a $\frac{1}{8}$ inch diameter tungsten electrode, and a tungsten nozzle insert with a $\frac{1}{4}$ inch diameter hole. The arc director strength is adjusted to bring the arc nearly vertical by adjusting rheostat 91 as described in my co-pending application referred to above.

The welding head is then lowered to bring the end of the nozzle very close to the material being welded, i. e. within about $\frac{1}{16}$ inch thereof, under the typical circumstances stated above. As the welding head is being lowered by motor 134, controlled by push button 133, the arc voltage decreases. The electronic control automatically backs the electrode up into the torch to hold this voltage to a plus or minus ¼ volt, for instance, by operating motor 123 so as to move rack 46, collet tube 14, collet 15 and the electrode upwardly, or rather to move the torch downwardly and hold the electrode in place. The electrode is then completely shielded, as shown in Fig. 5, and the arc is extremely stable and a smaller quantity of inert gas is required to maintain the long electrode life and the steady arc condition and uniform welding results. Furthermore, the velocity of the gas need not be as great as previously usually required, especially if the gas is helium, because it does not have as far to travel below the nozzle before it reaches the molten puddle of weld metal. With the welding arc thus established and controlled so as to remain constant, a high quality weld is produced at a high rate of speed such as 120 inches per minute for 3 inch diameter .049 inch wall stainless steel tubes or 84 inches per minute for ⅞ inch diameter, .083 inch wall stainless steel tubes.

In stopping the operation, stop button 83 is pressed, disconnecting the welding power source and the electronic control and closing the gas valves. A sensitive relay is preferably provided to perform the same functions automatically when the arc voltage suddenly increases beyond the welding voltage range, as, for instance, when the operator fails to feed another length of tube blank into the machine and the end of the blank being welded runs out from under the torch.

Having thus described the present invention so that those skilled in the art may be able to understand and practice the same, I state that what I desire to secure by Letters Patent is defined in what is claimed.

What is claimed is:

1. An electrode welding torch comprising an elongated hollow body, a nozzle cooperating with the body to define a continuous passageway to receive an electrode, electrode holder mechanism within said passageway, and automatic means for moving said mechanism axially relative to said nozzle to maintain a substantially constant arc voltage, said means comprising a rack carried by said mechanism, a pinion engaging the rack, a reversible motor operatively associated with the rack, and arc-voltage sensing means operatively associated with the motor to actuate said motor upon fluctuations in arc voltage beyond predetermined limits.

2. An electrode welding torch comprising an elongated hollow body, a nozzle cooperating with the body to define a continuous passageway to receive an electrode, electrode holder mechanism within said passageway, and automatic means for moving said mechanism axially relative to said nozzle to maintain a substantially constant arc voltage, said mechanism comprising a collet aligned with the nozzle opening, and said automatic means comprising a collet tube receiving and engaging the collet, a rack carried by the collet tube, a pinion engaging the rack, a reversible motor operatively associated with the rack, and arc-voltage sensing means operatively associated with the motor to actuate said motor upon fluctuations in arc voltage beyond predetermined limits.

3. An electrode welding torch comprising an elongated hollow body, a nozzle cooperating with the body to define a continuous passageway to receive an electrode, electrode holder mechanism within said passageway, means for moving the body lengthwise toward and away from a work piece to be welded, second means including an electric motor for moving said mechanism within the passageway slidably and non-rotatably axially relative to the body, and electrical means including arc voltage sensing means operatively associated with said motor and with an electrode carried by the said mechanism for automatically actuating the motor in response to arc voltage fluctuations and moving said mechanism relative to said nozzle and body to maintain arc voltage within predetermined limits.

WALTER S. SCHAEFER.

REFERENCES CITED

The following references are of record in the file of this patent:

UNITED STATES PATENTS

| Number | Name | Date |
|---|---|---|
| 1,946,305 | Catlett | Feb. 6, 1934 |
| 2,063,467 | Southgate | Dec. 8, 1936 |
| 2,360,160 | Pickhaver | Oct. 10, 1944 |
| 2,468,804 | Breymeier | May 3, 1949 |
| 2,468,807 | Herst | May 3, 1949 |

FOREIGN PATENTS

| Number | Country | Date |
|---|---|---|
| 863,983 | France | Jan. 8, 1941 |